July 2, 1963 C. E. WILLIAMS 3,096,501

SIGNAL PROCESSING APPARATUS

Filed Jan. 3, 1958 8 Sheets-Sheet 1

Cecil E. Williams
INVENTOR.

BY Frederick M. Arbuckle, Agent
Morris Spector,
ATTORNEY

Cecil E. Williams
INVENTOR.

BY Frederick M. Arbuckle, Agent
Morris Spector,
ATTORNEY

July 2, 1963 C. E. WILLIAMS 3,096,501

SIGNAL PROCESSING APPARATUS

Filed Jan. 3, 1958 8 Sheets-Sheet 3

Cecil E. Williams
INVENTOR.

BY Frederick M. Arbuckle, agent
Morris Spector,
ATTORNEY

Cecil E. Williams
INVENTOR.
BY Frederick M. Arbuckle, Agent
Morris Spector,
ATTORNEY

SIGNAL PROCESSING APPARATUS

Filed Jan. 3, 1958 8 Sheets-Sheet 5

Cecil E. Williams
INVENTOR.

BY Frederick M. Arbuckle, agent
Morris Spector,
ATTORNEY

SIGNAL PROCESSING APPARATUS

Filed Jan. 3, 1958 8 Sheets-Sheet 6

Cecil E. Williams
INVENTOR.

BY Frederick M. Arbuckle, agent
Morris Spector,
ATTORNEY

Cecil E. Williams
INVENTOR.

BY Frederick M. Arbuckle, agent
Morris Spector,
ATTORNEY

SIGNAL PROCESSING APPARATUS

Filed Jan. 3, 1958 8 Sheets-Sheet 8

Cecil E. Williams
INVENTOR.

BY Frederick M. Arbuckle, Agent
Morris Spector
ATTORNEY

United States Patent Office 3,096,501
Patented July 2, 1963

3,096,501
SIGNAL PROCESSING APPARATUS

Cecil E. Williams, Hawthorne, Calif., assignor, by mesne assignments, to Thompson Ramo Wooldridge Inc., Cleveland, Ohio, a corporation of Ohio Filed Jan. 3, 1958, Ser. No. 707,033
20 Claims. (Cl. 340—15.5)

The present invention relates to improvements in signal processing apparatus and more particularly to apparatus suitable for use in analyzing or comparing the electrical characteristics of one electrical signal with another electrical signal.

In many types of signaling systems where intelligence is derived through the analysis or comparison of one electrical signal with another electrical signal to ascertain the relationship of certain components in one signal to other components in the other signal, it has been found expedient to employ variable delay producing means so that the time relationship between the two signals to be compared may be controllably varied. This technique is commonplace in signal intelligence processing systems employing what is generally known as "signal correlation." Here, two electrical signals are effectively compared with one another for various discrete values of relative time delay between the two signals. In the more generally accepted meaning of the process known as "signal correlation," the two signals are compared by multiplying a delayed version of one signal by the other signal and the result integrated over a finite smoothing time to yield a resultant signal whose magnitude corresponds to the value of the correlation function between the two signals for a given value of correlation delay. Such technique is described in Report No. 144 of the Cruft Laboratories, Harvard University, entitled "An Analog Computer for Correlation Functions in Communication Systems," by R. A. Johnson, dated March 25, 1952.

In carrying out such signal comparison or signal correlation techniques, it is necessary to provide means for producing a number of discretely different values of time delay between the two signals being analyzed. Prior art methods for developing these discrete delays have employed such apparatus as passive delay lines tapped at various positions along their length to provide the desired delays. However, such techniques prove to be sometimes less than ideal, due to the characteristics of known forms of transmission lines or delay-producing circuits in which the signal to be delayed suffers increasing attenuation and phase distortion with increasing values of signal delay.

Other forms of signal delay means are, of course, known in the art, such as those based upon the recording and reproduction of an electrical signal through the agency of a moving recording medium. However, such techniques employ physical recording and reproducing instrumentalities whose size discourage the production of delay intervals less than a predetermined minimum. This predetermined minimum of available delay may be defined as an inverse function of the closeness with which the active recording and reproducing elements of juxtaposed or contiguous recording and playback instrumentalities can be associated in operative relation to the moving recording medium. Also, this minimum value of time delay is inversely proportional to the speed of the recording medium past the record and playback instrumentalities. Furthermore, known methods of recording and reproducing signals from a recording medium, especially magnetic recording systems, impose complex types of phase distortion on the components of the recorded signal. For this reason, it has not been thought practical to employ signal recording techniques as a delay producing means for imposing a plurality of discrete delays upon one signal relative to another signal for use in connection with signal correlation processes.

The present invention provides improved apparatus and techniques for imposing time delays upon one or between two electrical signals based upon the recording and reproduction of the signal or signals from a moving recording medium. By properly spacing predetermined groups or "sets" of recording and playback instrumentalities with respect to one another upon moving recording media the effective limitation in the prior art, imposed by the physical size of the recording and playback instrumentalities in realizing extremely small time delay values, is overcome. By imposing time delays of various magnitudes upon both of the signals to be compared, through a recording and playback cycle having similar distortion characteristics, the present invention provides improved apparatus for developing time delayed versions of electrical signals in a manner permitting faithful analysis of their relative characteristics for incremental time delay steps of any desired small magnitude over a time delay range of any desired large magnitude. By using the novel grouping techniques for the record and playback instrumentalities taught by the present invention, a large number of incremental time delay steps over a given time delay range may be achieved through the use of record and playback instrumentalities considerably less in number than the number of incremental steps to be provided.

In one embodiment of the present invention, a series of $N_t$ pairs of electrical signals are produced such that one member of each pair in the series represents a delayed version of signal A and the other member of each pair represents a delayed version of signal B, with the time delay difference between the members of each pair in the series being different. The present invention further provides that the time delay difference between the signals comprising one pair in said series differs from the time delay difference between signals in one other pair of said series by a time increment of $\Delta t$ time units. In producing these pairs of signals so that the maximum time delay difference between the signals comprising any pair in said series is $T_d$ time units, signal A and signal B are separately recorded on a moving recording medium through the agency of grouped "sets" of recording and playback instrumentalities acting upon the medium. Where the physical size of the instrumentalities is such that at a given velocity of the recording medium the producible time delay possible by the record and playback cycles of a recording instrumentality in contiguous relation to a playback instumentality is greater than the time increment $\Delta t$, the spacing relationships between the record and playback instrumentalities comprising a given "set" is established such that the time delay between adjacent playback instrumentalities, in any given group, is substantially greater than $\Delta t$ but an integral multiple thereof. The spacing between the record instrumentality and nearest playback instrumentality of each group is then made different from one another by a distance corresponding to an effective time delay value which is an integral multiple of the time increment $\Delta t$. Sets of such grouped instrumentalities are used for recording and subsequent playback of both signal A and signal B so that $N_c$ versions of signal A and $N_f$ versions of signal B are produced where $N_c \times N_f = N_t$. The spacing relationships between the playback instrumentalities employed for reproducing or "playing back" signal A are established at values corresponding to delays which are an integral multiple of $\Delta t$ so as to produce rather "coarse" stepped time delayed versions of signal A differing from one another by a time value $\Delta t_c$. On the other hand, the spacing of the playback instrumentalities employed in recording signal B are such that the time delay difference between playback versions of signal B differ from one another by a rather "fine" stepped time delay value $\Delta t_f$. In this way, the played back versions of signal A may be compared with the played back versions of signal B on the basis of said desired number of $N_t$ pairs by simultaneously applying signal A to all the record instrumentalities of its assigned "sets" of instrumentalities and signal B to the record instrumentalities of all of its assigned "sets" of instrumentalities.

A fuller understanding of the present invention and the various ways in which the novel principles underlying the present invention may be embodied in improved signal delay and signal analysis apparatus will be realized from a reading of the following description taken in combination with the accompanying drawings, in which:

FIGURE 1 is a diagrammatic representation illustrating the prior art limitations in producing signal delay by a recording and playback cycle, and the manner in which these limitations are overcome by embodying the principles of the present invention;

FIGURES 2*a* and 2*b* taken in combination constitute a diagrammatic representation of the manner in which grouped sets of record and playback instrumentalities may be employed to provide a plurality of stepped delays between two electrical signals in accordance with the present invention;

Figures 1, 2A:
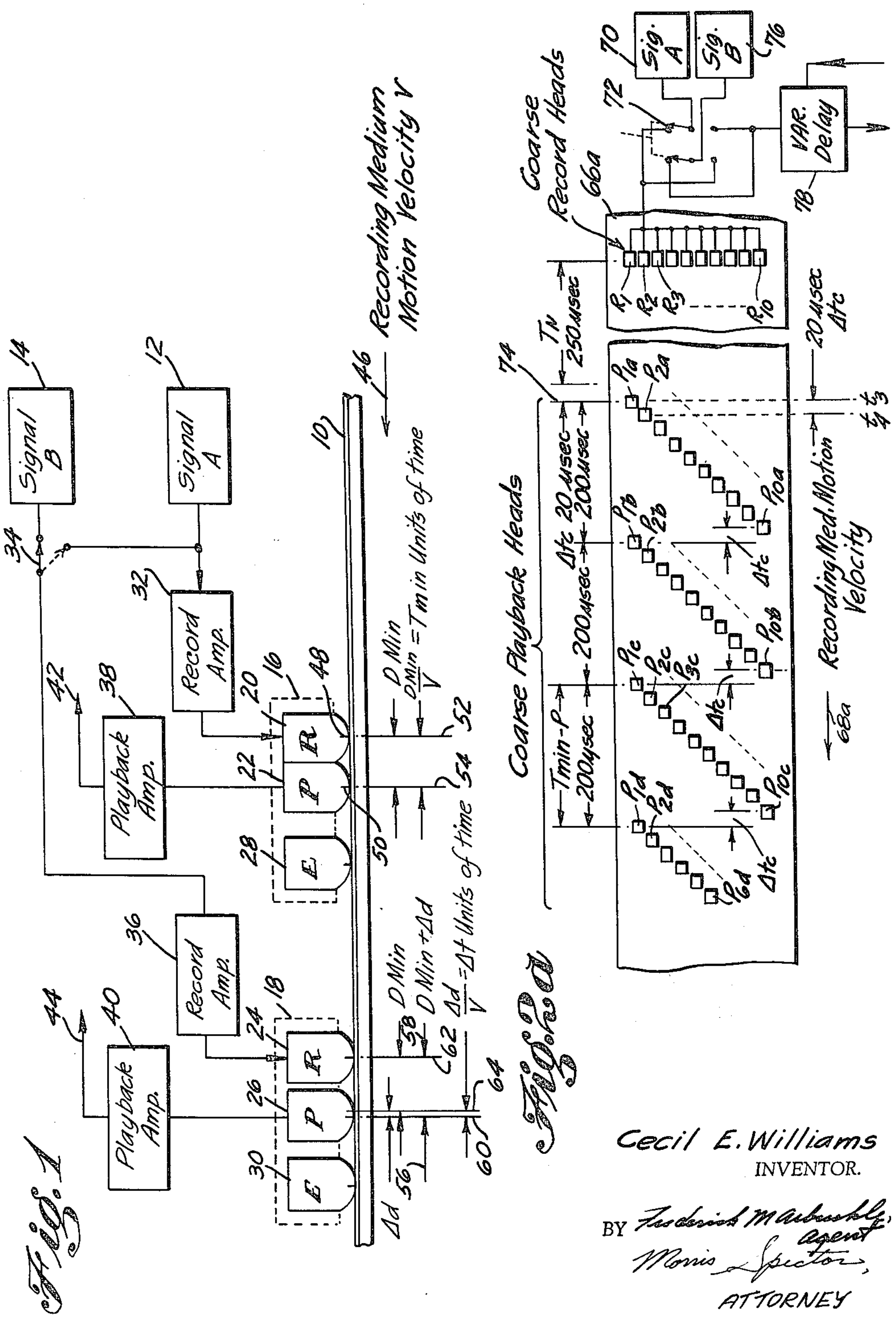

Turning now to FIGURE 1, a fundamental aspect of the present invention is illustrated in connected with a movable recording medium 10 through the agency of which the present invention makes possible the delay of a signal A whose source is indicated at 12 with respect to a signal B having a source at 14. In the discussion which follows, particular reference will be made to magnetic recording media associated with magnetic recording, playback and erase instrumentalities. However, as the nature of the present invention becomes clear, it will be appreciated that its novel principles and embodiments are in no way limited to any particular type of recording system. Other recording systems, such as disc, photographic, xerographic, electrostatic or any recording system using a recording medium sustaining relative motion with respect to recording and playback instrumentalities is contemplated.

Particularly in the arrangement of FIGURE 1, the recording medium 10 may be a magnetic tape or the surface of a magnetic drum or, indeed, may represent a magnetic recording wire upon which act two groups or "sets" of record and playback instrumentalities shown in the dotted line areas 16 and 18. Set 16 comprises a record instrumentality 20 and a playback instrumentality 22, while set 18 comprises a record instrumentality 24 and a playback instrumentality 26. In the art of magnetic recording, record and playback instrumentalities are commonly referred to as record and playback heads, respectively. It is with this in mind that reference in this specification and claims will variously be made to record and playback instrumentalities as record and playback heads, respectively. Likewise, a given grouping or combination of heads held by or confined by a unitary structure may be referred to variously as a group or set of heads. The head sets 16 and 18 in FIGURE 1 may also include erase means such as 28 and 30 if the action of the recording heads 20 and 24 do not in their recording action obliterate or erase unwanted recorded representations which might otherwise be held on the medium 10.

In the arrangement shown in FIGURE 1, signal A is applied to the input of a record amplifier 32, the output of which is connected in driving relation to the record head 20. Signal B is, in turn, connected through switch 34 to the input of record amplifier 36, the output of which is connected in driving relation to the record head 24. Playback heads 22 and 26 are connected to playback amplifiers 38 and 40, respectively, at whose output terminals 42 and 44 playback versions of recorded representations on the medium 10 may be examined or sampled.

Let it be assumed that the motion of the recording medium or tape 10 is in the direction of the arrow 46 at a given velocity V so that the time required for a given point on the tape 10 to move from the active portion or gap 48 of the record head 20 to the gap 50 on the playback head 22 is represented as $T_{min}$ units of time, illustratively indicated between the construction lines 52 and 54, respectively. The linear distance between the gaps 48 and 50 is likewise represented as $D_{min}$. In practice, $D_{min}$ represents the closest spacing practicable or possible between the record and playback heads 20 and 22 because of the physical size of the heads themselves. Record head 20 and playback head 22 are shown in close contiguous juxtaposition with their gaps in operative relation to the tape 10. For any given set of record and playback heads and with a given value of tape velocity V, it is, therefore, apparent that it is impossible to provide a signal delay through the employment of a record and playback cycle which is less than $T_{min}$.

However, let it be further assumed that it is desired to generate a signal delay between signal A and signal B of value $\Delta t$ units of time substantially less than $T_{min}$, and let it be further assumed that the electrical characteristics of signal A and signal B are to be undisturbed, relative to one another, to the extent that they may be later compared and/or analyzed on a comparative basis. With this latter point in mind it is to be understood that, should signal A be subjected to a record and playback cycle which inherently imposed distortion upon the signal, unless a similar distortion were imposed upon signal B, useful analytical comparison of the two signals would be difficult especially where the distortion produced by the record and playback cycle was of a complex nature not easily duplicated by passive networks which might be imposed in series with signal B before comparison with the delayed version of signal A was undertaken.

Therefore, in accordance with the present invention as illustrated in FIGURE 1, the spacing between the record and playback instrumentalities 24 and 26 is made greater than $D_{min}$ by an amount $\Delta d$, as shown by the arrows 56 and 58 in conjunction with construction lines 60 and 62 where $D_{min}$ itself is again indicated between the construction lines 64 and 62. The distance $\Delta d$ itself is indicated between construction lines 60 and 64 and this $\Delta d$ difference in the distance between the record and playback heads of group 18 and the record and playback heads of group 16 corresponds to a time delay of $\Delta t$ units of time based upon the same value of tape velocity indicated in the discussion of $T_{min}$. It is then seen that the generated difference in the time between the playback version of signal A, available at output terminal 42, and the playback version of signal B, available at output terminal 44, will be $\Delta t$ units of time which is substantially less than $T_{min}$. Since the characteristics of signal A and signal B as delivered by their sources may or may not permit rigorous definition of their timing relation, the term time delay or generated time delay as used throughout this specification and claims will, unless specifically otherwise noted, refer exclusively to the time displacement between two signals or versions of the same signal attributable to the operation of time delay producing apparatus. Moreover, it will appear that both signals A and B have been subjected to the same general character of distortion so that analytical comparison of the two playback versions of the signals may be effectively carried out without regard to the precise nature of the distortion imposed by a record and playback cycle on either signal. It may further be seen that the value of $\Delta t$ may be made as small as desired and that the two sets of heads 16 and 18 may be caused to operate upon separate recording media operating at different fixed velocities, provided of course that appropriate head spacing is employed. Furthermore, where two different recording media operating at different speeds are provided, the time increment $\Delta t$ for a given head spacing arrangement may be modified by controlling the velocities of the recording media. It is further envisioned by the present invention that switch 34 may be operated to apply signal A to both record instrumentalities whereby the output terminals 42 and 44 of playback amplifiers 38 and 40 will present electrical signals representing versions of signal A delayed with respect to one another by a time delay value of $\Delta t$ time units. In the discussion which follows it will also be helpful to note that in FIGURE 1 the drawing construction lines 54 and 64 correspond to physical locations at which, if the recorded representations on the medium are detected or played back, the relative delay between the played back signals, attributable to the two separate record and playback cycles, will be zero. Lines 54 and 64 may, therefore, be regarded as indicating a time reference, and the actual magnitudes of the spacing of these lines with respect to the record heads may be any value in excess of $D_{min}$, but always equal to one another for a given value of tape motion velocity.

Figure 2B:
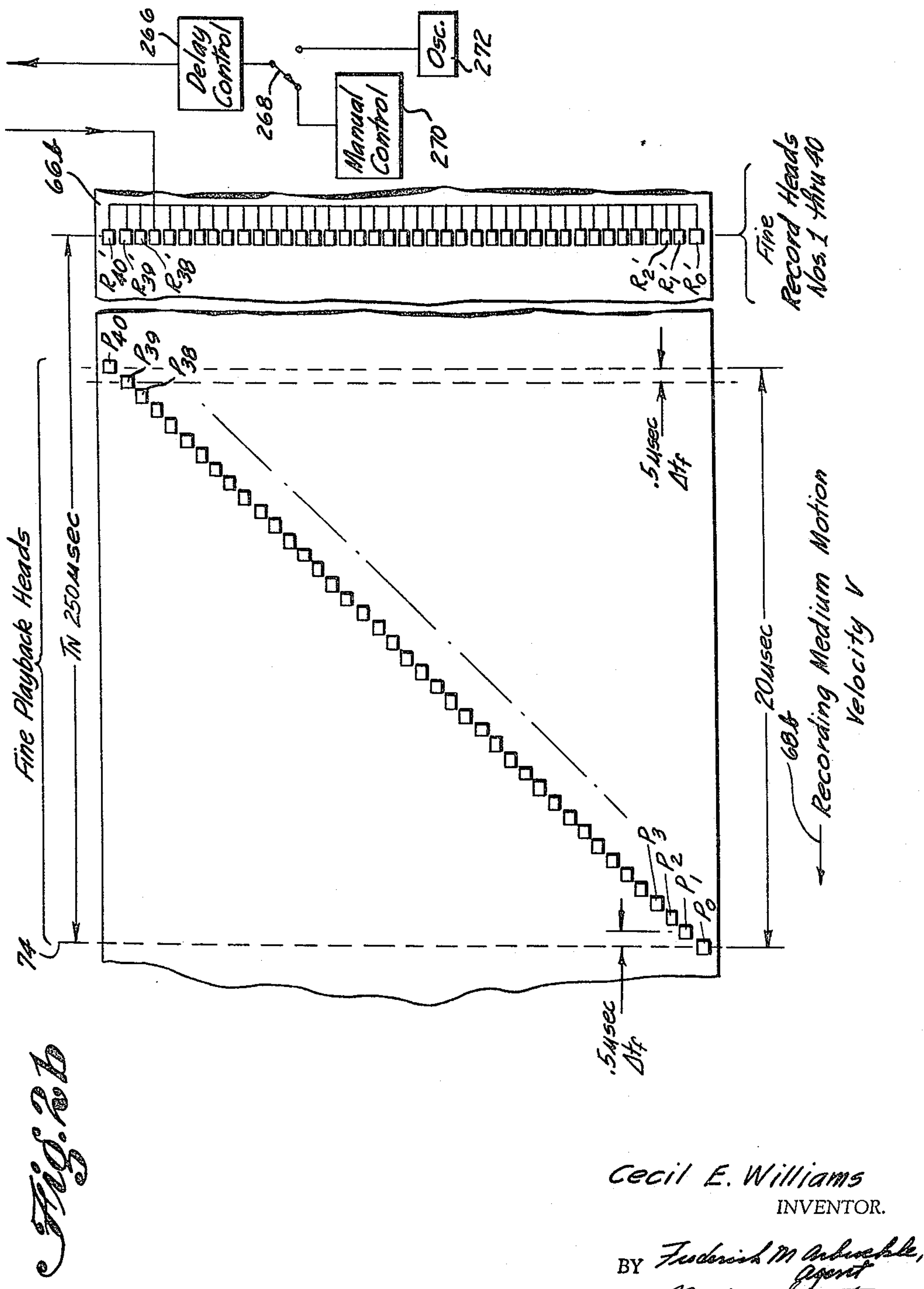

A novel adaptation of the principles discussed in connection with FIGURE 1 is also contemplated by the present invention in an embodiment of the general character illustrated in FIGURES 2*a* and 2*b*. Here a series of $N_t$ pairs of playback signals, one member of each pair corresponding to a playback version of signal A and the other member of each pair corresponding to a playback version of signal B, is to be generated, with the generated time delay difference between the members of any one pair in said series differing from one other pair in said series by a time delay difference $\Delta t$, said series of said $N_t$ pairs of signals covering, on this basis, a time delay range of $T_d$ units of time and excluding a generated time delay value of zero. As will later be seen, a noteworthy feature of the embodiment shown in FIGURES 2*a* and 2*b* is that the number of the record and playback heads needed for producing said $N_t$ different pairs of delayed signals is less than $N_t$ so that considerable economies may be realized in the construction of a signal delay producing apparatus over that of the mere duplication of $N_t$ sets of record and playback instrumentalities of the type indicated at 16 and 18 in FIGURE 1. As will be seen, this is accomplished by novel groupings of record and playback instrumentalities in groups or sets which include sets having one or more playback instrumentalities cooperating with a single record instrumentality. Where the recording and playback cycle of the signals to be delayed is of the magnetic variety, the record and playback instrumentalities may be conveniently referred to as record heads and playback heads, as indicated in FIGURES 2*a* and 2*b*.

In order to insure that the number of record and playback heads needed for producing the $N_t$ different pairs of delayed signals is less than $N_t$, the present invention provides for two separate signal delay systems both of which employ the principles illustrated in FIGURE 1 of the drawings. The first signal delay system, which may be considered as being illustrated in FIGURE 2*a*, is assigned the task of providing a series of $N_c$ playback signal versions of signal A with each of said signals in said series bearing a different arithmetic value of "coarse" signal delay in one direction with respect to and including zero delay relative to a time reference. The second delay system may be considered as a "fine" delay system and provides $N_f$ playback signal versions of signal B with each version bearing a different arithmetic value of signal delay in the opposite direction with respect to and excluding zero delay relative to the same time reference. The fine delay system is illustrated in FIGURE 2*b*.

Further considering the coarse delay and fine delay systems shown in FIGURES 2*a* and 2*b* it will be seen that with $N_c$ different delayed versions of signal A and $N_f$ different versions of signal B, $N_t$ different signal pairs are then made available, each different pair comprising one version of signal A and one version of signal B, where $N_t = N_c \times N_f$. Each of the resulting pairs comprising the series of $N_t$ pairs of signals will represent discretely different arithmetic values of relative delay between signals A and B, provided the number of equal-valued sums resulting from individual addition of each arithmetic value of signal A delay with each arithmetic value of signal B delay is zero.

Now then, if a delay range $T_d$ is to be covered by successive generated steps of $\Delta t$ time units, with no step equal to a value of zero generated delay, the number of $N_t$ steps required can be seen to be equal to $$N_t=\frac{T_d}{\Delta t}$$

with the maximum delay of any step being equal to $T_d$ time units. To provide this in continuous steps by coarse and fine delay systems in accordance with the present invention, the coarse delay system must supply a series of $N_c$ stepped delayed versions of signal A starting from and including an arbitrary time reference, each version in the series being displaced in time from one other member in the series by the value $\Delta t_c$ time units. On the other hand, the fine delay system must supply a series of $N_f$ stepped delayed versions of signal B starting from but excluding the same time reference, with each version in the series being displaced by one other version in the series by $\Delta t_f$ time units. It is also necessary, in the embodiment of the present invention shown in FIGURES 2*a* and 2*b*, that the $N_f$ versions of signal B represent time displacements starting from a time $\Delta t$ time units removed from the time reference and all going in a direction opposite to the time displacements of signal A relative to the same time reference. To provide the equal-valued steps of time delay $\Delta t$ on a continuous basis over the total time delay range $T_d$, it is necessary that $\Delta t_c$ be an integral multiple of $\Delta t$ so that $\Delta t_c=M(\Delta t)$ where M is an integer. The number of fine time displaced versions of signal B will, therefore, be seen to be equal to M where $$M=\frac{\Delta t_c}{\Delta t}$$

this again assuming that the specific value of zero generated time delay is to be excluded. If time delay value of zero is required, then $M+1$ fine time delay playback versions of signal B are required, one of which represents zero generated delay of signal B with respect to the time reference. As will be later brought out, the fine delay generating system illustrated in FIGURE 2*b* provides for generation of this zero value of delay if desired.

By way of specific example, let it be assumed that it is desired to provide $N_t$ pairs of signals representing relatively delayed versions of signal A and signal B covering a total time delay range of 720 microseconds so that each step of relative delay shall be .5 microsecond. Therefore, $$N_t=\frac{T_d}{\Delta t}=\frac{720}{.5}=1440$$

From this it will be seen that a series of 1440 pairs of signals must be provided with the first member in each pair representing a version of signal A and the second member in each pair representing a version of signal B, with the time delay difference between the signals in one pair differing from the time delay difference between signals in one other pair in the series by $\Delta t=.5$ microsecond.

Where $N_c$ and $N_f$ as defined above respectively represent the required number of different delayed versions of signal A and signal B respectively, it is seen that $N_c\times N_f$ must equal 1440 and if the integer M is set at 40, then $\Delta t_c$ (the interval or value of coarse time delay) equals $40\times\Delta t$. A series of $N_f=40$ different versions of signal B must, therefore, be provided with each version bearing an arithmetic value of .5 microsecond signal delay relative to one other version in the $N_f$ series. These values of delay should be in a direction, relative to a given time reference, which is opposite to that which the $N_c$ different delayed versions of signal A are provided relative to this same reference. On the other hand, 36 delayed versions of signal A must be provided, with each time delay version arithmetically differing from one other version by $\Delta t_c=M\Delta t=40\times.5=20$ microseconds, so that $$N_c\times N_f=36\times 40=1440$$

Turning now to FIGURES 2*a* and 2*b* taken in combination and preferably viewed when reading the following description with FIGURES 2*a* placed immediately above and in alignment with FIGURE 2*b*, representations at 66*a* and 66*b* depict a recording medium or media capable of being moved or driven at the same or different velocities past a plurality of record and playback heads. It is to be understood that the recording medium **66*a* and the recording medium 66*b* may be separate from one another or represent contiguous portions of a single recording medium which, for example, may be contained or supported by a drum or belt member (not shown). For purposes of simplifying the present description, it is convenient to assume that the recording media 66*a* and 66*b* are both defined on the surface of a single drum with the motion of the drum surface and hence the recording media being in the direction of the arrows 68*a* and 68*b*. Under these assumed conditions, the media 66*a* and 66*b*** taken together may be thought of as a single recording medium. To provide the 36 versions of signal A representing stepped time delays of signal A of $\Delta t_c=20$ microseconds, the coarse delay system of the present invention shown in FIGURE 2*a* is provided. In both FIGURES 2*a* and 2*b* which shall be described hereinafter, it will be assumed that the velocities of the recording media comprising **66*a* and 66*b* in the directions of the arrows 68*a* and 68*b*** are the same, this being consistent with the assumption in this example that both media are being effectively driven together and/or are separate parts of what may be considered a single recording medium. It is further assumed that at the velocity V of this recording medium, the physical size of the playback heads prevents a sufficiently close spacing with respect to one another to produce a time delay of less than 200 microseconds between adjacent playback heads. Therefore, the problem presents itself of producing a time delay between playback versions of signal A which is substantially one-tenth the value of the minimum delay possible by physically spacing playback heads along the recording medium in a contiguous relation. A novel application of the principles described in connection with FIGURE 1 are, therefore, brought into play by a further aspect of the present invention so that 20 microsecond delayed versions of signal A can be provided by ten sets of recording and playback heads.

Still considering the arrangement in FIGURE 2*a* comprising the coarse time delay system, the first "set" of heads comprise a record head $R_1$ and playback heads $P_{1a}$, $P_{1b}$, $P_{1c}$ and $P_{1d}$ taken in combination. The second set comprises record head $R_2$ and playback heads $P_{2a}$, $P_{2b}$, $P_{2c}$ and $P_{2d}$, with similarly designatable groups or sets of heads based upon record heads $R_3$ through $R_{10}$ with the latter record head being grouped in the tenth set of heads including playback heads $P_{10a}$, $P_{10b}$, and $P_{10c}$. Thus, signal A may, as shown in FIGURE 2*a*, having its source at 70, be simultaneously applied through switch 72 to all of the records head $R_1$ through $R_{10}$ so that ten versions of signal A are recorded on ten separate tracks defined on the recording medium. The recorded representations of signal A are then sensed by the playback heads in each group. The spacing between the playback heads themselves in each and all sets is made equal to the product of the number of the record heads $N_R$ and the coarse delay $\Delta t_c$ so that $N_R\times\Delta t_c=10\times 20=200$ microseconds. The actual spacing between the record heads and each playback head or the first playback head in each group is not important, provided that these spacings differ from one another by an amount providing the $\Delta t_c=20$ microseconds time delay difference between signals developed by the first playback heads in each head set. Of course, the record-playback head spacing cannot be smaller than the physical size the record and playback heads permit. Therefore, a time reference shown at 74 is arbitrarily shown displaced 250 microseconds from the recording time of signal A, and playback head $P_{1a}$ displaced in time from this reference 74 by 20 microseconds. Playback head $P_{2a}$ is, of course, 20 microseconds displaced from $P_{1a}$. Playback head $P_{10a}$ will, therefore, be 180 microseconds displaced from the signal produced by playback head $P_{1a}$. Likewise, playback head $P_{1b}$, displaced 200 microseconds from playback head $P_{1a}$, will produce a playback version of signal A 20 microseconds displaced from the signal delivered by playback head $P_{10a}$. With six head sets including four playback heads and four head sets including three playback heads, a series of $N_c=36$ versions of signal A are made available, each version in the series differing from one other version by 20 microseconds. The maximum delay of signal A produced by the delay system of FIGURE 2*a* is, of course, available at playback head $P_{6d}$ and represents a 700 microsecond delay of signal A relative to the time reference 74. All but one version of signal A are also seen to be delayed or "late" relative to the time reference 74. Signal from playback head $P_{1a}$, of course, has zero delay relative to the time reference 74.

In order to provide the $N_f=40$ delayed versions of signal B, each member of the series bearing a different arithmetic value of signal delay which is an integral multiple of $\Delta t=.5$ microsecond in a direction which is "early" with respect to the time reference 74 shown in FIGURE 2*a*, a "fine" delay producing system shown in FIGURE 2*b* may be provided. The apparatus shown in FIGURE 2*b* comprises 41 record heads and 41 playback heads arranged in 41 head "sets," acting on a recording medium 66*b*. In accordance with the present invention, these head sets are arranged to generate stepped values of time delay over a range of 20 microseconds which is equal to $\Delta t_c$. This delay range is provided in steps of $\Delta t=.5$ microsecond. One extremity of this 20 microsecond fine delay range is defined by the time reference line 74 and extends in a direction which provides representations of signal B which bear an early timing relationship with respect to the time reference 74. It will be noted that the scale of the drawing in FIGURE 2*b* is larger than that employed in FIGURE 2*a*, since, for illustrational clarity, it is necessary to show greater detail in FIGURE 2*b* as to just how the 20 microsecond, $\Delta t_c$ interval, is broken up into .5 microsecond portions by controlling the spacing relation between the record and playback heads in each head set.

In the arrangement of FIGURE 2*b*, only 40 actual delayed "early" versions of signal B are required to provide, in combination with the 36 delayed versions of signal A (FIGURE 2A), the required 1440 pairs of signals covering the time delay range $T_d$. For this purpose, the 40 sets of heads comprised of record and playback heads $R_1'$—$P_1$, $R_2'$—$P_2$, $R_3'$—$P_3$ . . . etc., to $R_{40}'$—$P_{40}$ are employed. Head set $R_0'$—$P_0$ is shown on an optional basis, should a value of zero relative delay between playback versions of signal A and signal B be desired.

In FIGURE 2*b*, signal B having its source at 76 is simultaneously applied to all of the fine delay record heads $R_0'$ through $R_{40}'$. Head set $R_1'$—$P_1$ is then arranged so that the version of signal B delivered by $P_1$ is displaced $\Delta t=.5$ microsecond "early" from the time reference defined by 74 or, indeed, .5 microsecond from the version of signal A delivered by playback head $P_{1a}$ in FIGURE 21 (it being remembered that $P_{1a}$ is positioned to in effect coincide with the time reference 74). Thus, the spacing between $R_1'$ and $P_1$ in the first fine delay head set corresponds to a record-playback delay cycle of $T_N-\Delta t=250-.5=249.5$ microseconds. In the series of 40 fine record and playback heads, the spacing between the record and playback heads in one head set is then adjusted to differ from that of one other head set in the series by an amount corresponding to the time delay $\Delta t=.5$ microsecond. Thus, the actual record-reproduce delay provided by fine delay head set $R_{40}'$—$P_{40}$ will be $T_N-40\Delta t=250-20=230$ microseconds. With this, the relative delay between the version of signal B appearing at $P_{40}$ (FIGURE 2*b*) and the version of signal A appearing at $P_{6d}$ (FIGURE 2*a*) will be 720 microseconds$=T_d$, the delay range which, in the example under consideration, it was originally sought to generate.

Again, it will be appreciated that this time delay range $T_d$ equal to 720 microseconds will, with the use of only 40 fine delay head sets, be available in .5 microsecond steps starting with a minimum delay of .5 microsecond. Where zero delay between playback versions of signal A and signal B is required, head set $R_0'$—$P_0$ may be employed whereby the playback version of signal B available at playback head $P_0$ (FIGURE 2*b*) will have a zero relative delay with respect to the playback version of signal A available at playback head $P_{1a}$ (FIGURE 2*a*). When the fine delay head set $R_0'$—$P_0$ is employed, there are actually 41 playback versions of signal B provided, which will actually provide $N_c \times N_f=36\times 41=1476$ possible different pairs of signal A and signal B playback versions. However, 35 of these pairs will represent duplications of relative arithmetic values of time delay otherwise obtainable without the use of the fine delay head set $R_0'$—$P_0$ so that $(N_c \times N_f)-35=(36\times 41)-35=1441$ pairs of signals representing versions of signal A and signal B and each representing a different value of relative delay between signal A and signal B will be made available, one of these values of signal delay being zero.

The coarse delay and fine delay generating systems of FIGURES 2*a* and 2*b* respectively can now be seen to provide the required $N_t=1440$ pairs of signals representing versions of signal A and signal B covering a time delay range of 720 microseconds in .5 microsecond steps and when a forty-first fine delay head set is employed as shown in FIGURE 2*b*, actually 1441 values of relative signal delay are made available where one of these values is zero. More specifically, and now referring to both FIGURES 2*a* and 2*b*, signals from $P_{1a}$ and $P_0$ will represent zero delay. Signals from $P_{1a}$ and $P_1$ will reperesnt .5 microsecond relative delay, and so forth, with signals from $P_{1a}$ and $P_{40}$ representing 20 microseconds of relative delay. Signals from $P_{2a}$ and $P_1$ will represent 20.5 microseconds of delay, signals from $P_{2a}$ and $P_2$, 21 microseconds of delay, and so forth, with signals from $P_{6d}$ and $P_{40}$ representing 720 microseconds of relative delay. In the arrangement shown, it will be realized that the generated delays provided by the apparatus of FIGURES 2*a* and 2*b* as above described provide pairs of signals in which representations of the signal recorded and played back on the fine delay generating channel will be ahead of or "lead" signals reproduced from the coarse delay generating channel. However, it is contemplated by the present invention that the coarse delay channel can, in effect, be positioned on the tape medium at a time ahead of an arbitrary time reference such as 74 and the fine delay channel be positioned after this time reference. This will then render coarse delay versions of reproduced signals in a leading time relation to fine delay versions of reproduced signals.

In accordance with the present invention, the switch 72, shown in FIGURE 2*a*, may be provided for effectively doubling the range of delay $T_d$ over which .5 microsecond steps of relative delay between versions of signals A and B are made available. As brought out above, with switch 72 actuated in the state shown in FIGURE 2*a*, signal A is applied to the coarse delay generating channel and signal B is applied to the fine delay generating channel. This results in 1440 pairs of signals, each pair comprising versions of signal A and signal B, with signal B leading signal A. By actuation of switch 72, signal B can be, instead, applied to the coarse delay generating channel and signal A to the fine delay generating channel. This will then provide a series of 1440 additional pairs of signals representing versions of signal A and signal B in which signal B is behind or lags signal A relative to a time reference such as indicated at 74 in FIGURES 2*a* and 2*b*.

Thus, substantially 2880 values of relative time delay may be obtained from the apparatus shown in FIGURES 2*a* and 2*b*. It will be further understood that the present invention is in no way limited in its usefulness to the generation of relative delays between two signals which are equa-spaced or stepped by a given increment of time delay with respect to one another, nor are the specific values of delay which are to be generated necessarily limited to multiples of an integer.

Figure 3:
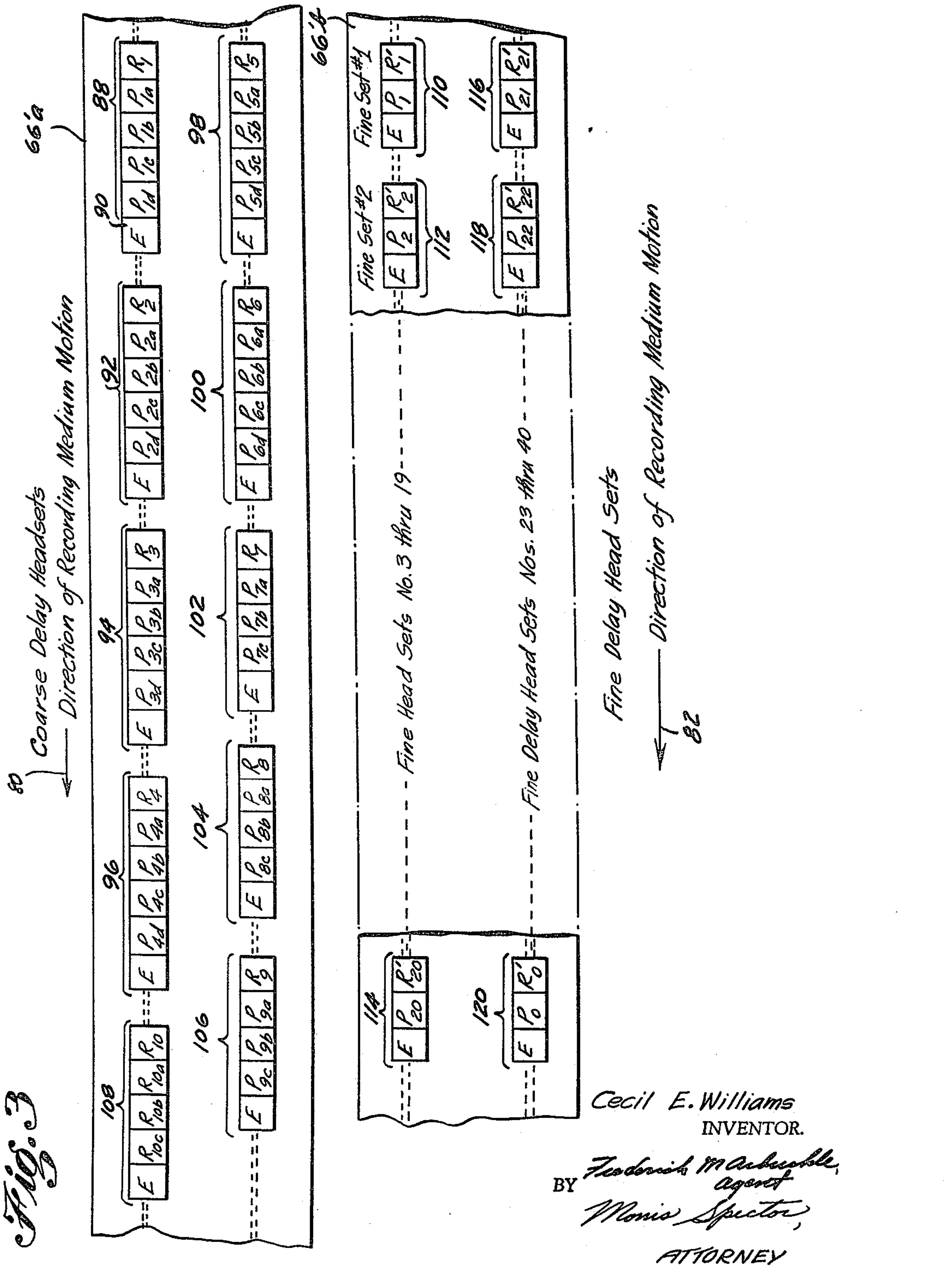
FIGURE 3 is a diagrammatic showing of the manner in which the grouped sets of record and playback instrumentalities illustrated in FIGURES 2*a* and 2*b* taken in combination may be physically positioned relative to one or more moving recording media.

Turning now to FIGURE 3, one possible arrangement of the head sets utilized in both the coarse delay generating system and fine delay generating system of FIGURES 2*a* and 2*b*, respectively, is shown with reference to recording media **66*a*' and 66*b*'. Again, the media 66*a*' and 66*b*' may be separate from one another, driven in the same or opposite directions of motion at the same or different velocities and may, in fact, be different portions of a single recording medium. For descriptive purposes, the direction of recording medium motion is indicated by the arrows 80 and 82 and it will be assumed that the spacing of the record and playback instrumentalities in each head set is conformed in accordance with the velocity of the associated recording medium in accordance with the principles of the present invention described above. The arrangement illustrated in FIGURE 3 makes clear the fact that the coarse delay head sets and the fine delay head sets may, in the interest of convenience, be placed adjacent one another along a single recording medium or adjacent one another along different parallel tracks of a single recording medium. An erase means, which may be an electromagnetic or permanent magnet erase head, may be interposed between the head sets should the nature of the recording action fail to obliterate recorded representations on the medium imposed thereon by an adjacent head set. Thus, the first coarse delay head set represented at 88** may comprise coarse record head $R_1$ and coarse playback heads $P_{1a}$, $P_{1b}$, $P_{1c}$ and $P_{1d}$ in the manner indicated in FIGURE 2*a*. Erase means 90 may be included in the head set, if desired, and may be placed ahead of the record head $R_1$ or, as shown, after the playback head $P_{1d}$. Coarse delay head sets including erase means are also shown at 92, 94, 96, 98, 100, 102, 104, 106 and 108, each respectively corresponding to coarse delay head sets 2, 3, 4, 5, 6, 7, 8, 9 and 10, as indicated in FIGURE 2*a*. Fine delay head sets including suitable erase means are similarly indicated in operative relation with the recording medium represented at **66*b*'. Fine delay head set number one comprising record head $R_1$ and playback head $P_1$ is indicated at 110, fine delay head set number 2 at 112 and fine delay head set number 20 at 114. For illustrational convenience, fine delay head sets 3 through 19 have been indicated by a legend and dotted lines between fine delay head set number 2 and fine delay head set number 20. Similarly, fine delay head sets 21 through 40 and also fine delay head sets $R_0'$—$P_0$ have been illustrated at 116, 118 and 120 in combination with the legend between the head sets at 118 and 120**.

Figure 4:
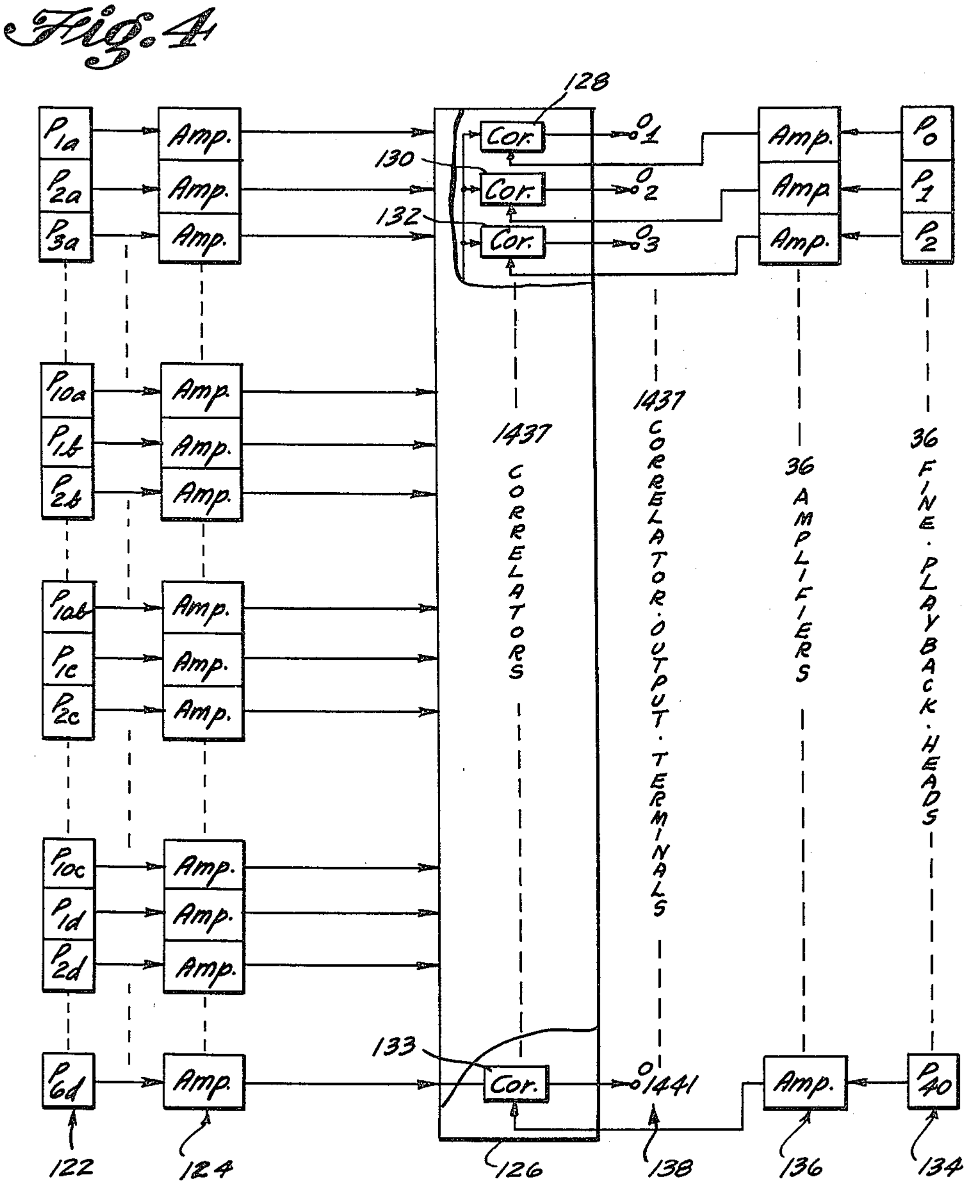
FIGURE 4 is a block diagram showing how the pairs of delayed signals produced by the grouped record and playback instrumentalities depicted in FIGURE 3 can be utilized for analyzing the relationship between the characteristics of two electrical signals through the process of signal correlation.

A particular application of the delay generating apparatus of FIGURES 2*a* and 2*b* to a signal correlation system in which the two signals, signal A and signal B, are to be correlated with respect to one another for 1441 different values of correlation delay is illustrated in FIGURE 4. Here, the coarse delay playback heads of the apparatus illustrated in FIGURE 2*a*, FIGURE 2*b* and FIGURE 3 are generally indicated at 122. A corresponding plurality of signal playback amplifiers are indicated at 124, with 1441 correlators indicated in the block 126. Four of the 1441 correlators have, for illustrational convenience, been indicated at 128, 130, 132, and 133. The correlators themselves may take a variety of forms such as shown, by way of example, in the above-referenced report #144 of the Cruft Laboratories, Harvard University, or, by way of example, of the type shown in United States Patent 2,166,991 to G. Guanella issued July 25, 1939. These correlators are, by way of example, signal acceptance means wherein the two signals A and B may be compared. In a similar manner, the 41 fine delay playback heads indicated in FIGURE 2*b* and FIGURE 3 are indicated at 134, with a corresponding plurality of playback amplifiers at 136. The output signals from the playback amplifiers 124 and 136 are applied in pairs to the signal correlators 126, with the signals applied to a given correlator representing one playback version of signal A and one playback version of signal B. Each correlator receives a signal pair in which the relative generated delay between playback versions of signal A and signal B is different so that, at a plurality of correlator output terminals, generally indicated in line with the arrow 138, 1441 correlator output signals may be sampled or otherwise measured or analyzed. Thus, for a total correlation time delay interval of 1440 microseconds relative to which it is desired to correlate signals A and B with respect to one another on the basis of .5 microsecond steps in correlation delay time, it will be seen that correlator 128 will provide at its output terminal $0_1$ a signal representing the value of the signal A—B correlation function at a value of zero relative correlation delay. The output signal of correlators 130 and 132 respectively represent values of the correlation function between signal A and signal B for correlation delays of .5 microsecond and 1 microsecond, respectively. The output of correlator 133 which accepts signals from head $P_{6d}$ and head $P_{40}$ will provide a signal representing the value of correlation function for a correlation delay of 720 microseconds.

The manner in which the novel features of the present invention provide unique techniques for analyzing the correlation function of signals A and B over this correlation time delay range will be discussed in connection with FIGURES 13 and 14 hereinafter.

In order to reduce even further the number of head sets, especially in the fine delay channel, required in the practice of the present invention, advantage may be taken of the fact that practical, useful, wideband signal delays in the order of 1 to 2 microseconds may be realized by known forms of delay lines or other delay producing means. This is illustrated in FIGURE 5 of the drawings wherein the coarse delay playback heads $P_{1a}$ through $P_{6d}$ are indicated generally at 140 and the fine delay playback heads are indicated at 142. Suitable playback amplifiers for both sets of heads are indicated at 144 and 146, respectively. The 1441 correlators are indicated by the partially broken block at 148, with the output terminals of the correlators $0_1$, $0_2$, $0_3$ to $0_{1441}$ generally at 150. Input signals to the correlators 148, corresponding to time displaced versions of signal B normally generated by fine delay playback heads $P_0$, $P_1$ and $P_2$ can be provided by delaying the signal delivered by playback head $P_3$ by three .5 microsecond delay producing means indicated at 150, 152 and 154. By this means, the fine delay head sets $R_0'$—$P_0$, $R_1'$—$P_1$ and $R_2'$—$P_2$ may be eliminated, thus constituting a saving in the cost of the over-all delay generating apparatus of FIGURES 2*a* and 2*b*. The operational equivalency of the delay of signal $P_3$ to produce signals equivalent to what otherwise would be produced by playback heads $P_0$, $P_1$ and $P_2$ will be seen by a study of FIGURE 2*b*. Switches indicated at 156, 158 and 160, shown in a position corresponding to the operation indicated in FIGURE 4 may, therefore, be operated to the position shown by the dotted lines to apply signals from the delay lines 150, 152 and 154 to the correlators in block 148.

Figures 5, 13, 14:
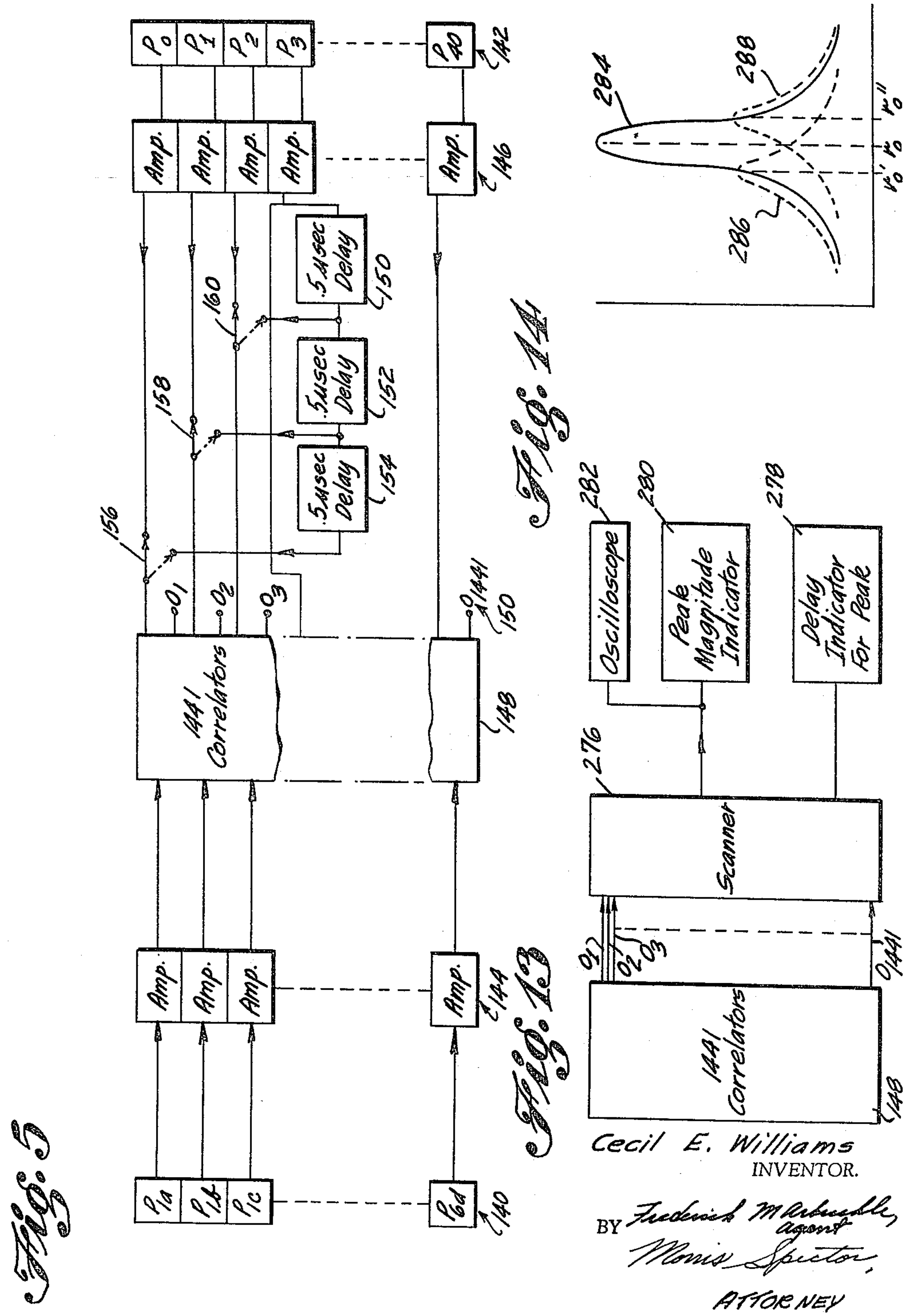
FIGURE 5 is a block diagram representation of a modification of the arrangement shown in FIGURE 4 to permit a reduction in the number of playback instrumentalities required in the embodiment of the invention illustrated in FIGURE 3.
FIGURE 13 is a block diagram representation of how the results of signal comparison provided by the signal correlation arrangement shown in FIGURE 4 may be examined and which, taken in combination with the novel arrangement shown in FIGURES 2*a* and 2*b*, yields an improved system for examining with more accuracy the relationship between two signals than afforded by many prior art arrangements.
FIGURE 14 is a graphical representation of a signal correlation function derived from data producible by the arrangement shown in FIGURE 13 and illustrating the nature of the improved accuracy in signal correlation analysis which the present invention affords.

The technique illustrated in FIGURE 5 is, of course, a workable modification of the embodiment of the present invention shown in FIGURE 4 for any signal delay generating system of the type described for reducing both the number of coarse delay head sets and fine delay head sets whenever it is found possible to provide practical delays of playback versions of either signal by passive delay networks at delay magnitudes equivalent to the coarse and/or fine time delay increments. It will be further seen that, in applications where generated signal delays between two signals such as signal A and signal B are to be used for correlation analysis, the value of zero delay may effectively be realized by sampling signal A and signal B prior to their actual recording such as, for example, at the outputs of the two recording amplifiers handling signal A and signal B.

It is an important feature of the present invention to note that the arrangement descriptively shown in FIGURES 2*a* and 2*b* is of particular advantage when the maximum delay provided by the coarse delay record and playback system is made less than the time duration of either signal. Under these conditions, the 1440 pairs of relatively delayed signals will be available simultaneously by the simultaneous sampling and combining of signals appearing at the playback heads of both the coarse and fine delay generating systems. In practice, it is further contemplated that the maximum delay produced by the coarse delay generating system will be less than what is commonly known as the integration, filtering, or smoothing time of the correlators to which playback versions of signal A and signal B are applied as shown in FIGURES 4 and 5. The practical value of correlation circuit smoothing time is in the order of 10,000 microseconds under conditions when signals A and B have frequency bandwiths of one megacycle per second.

Figure 6:
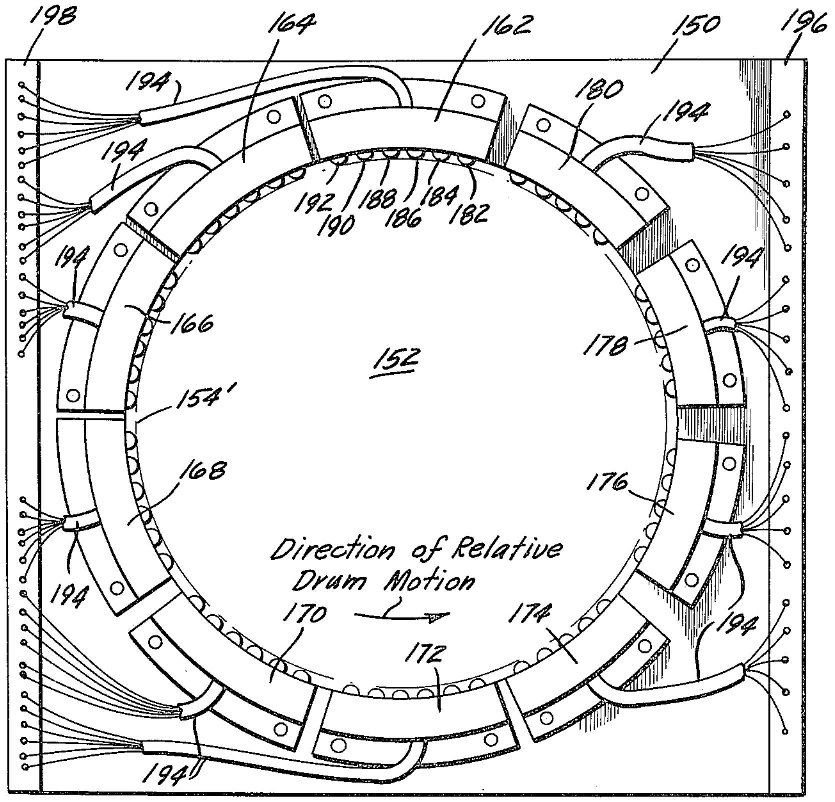
FIGURE 6 is an elevational view of apparatus for holding "sets" of record and playback instrumentalities in operative relation to a moving recording medium which is established on the periphery of a rotating drum.
Figure 8:
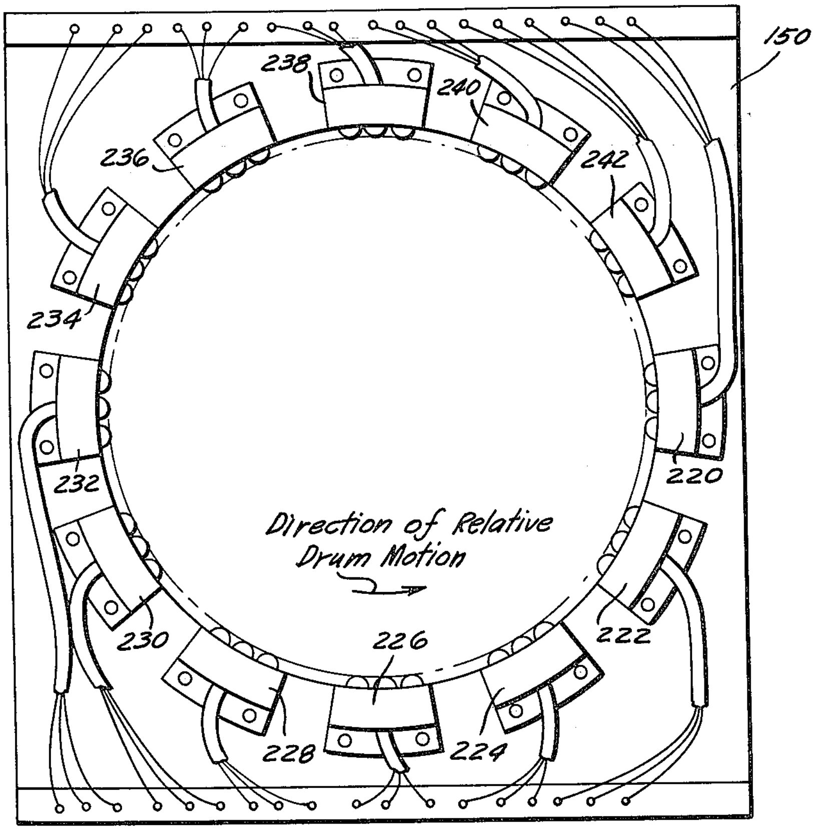
FIGURE 8 is an elevational view of apparatus for holding "sets" of record and playback instrumentalities in operative relation to a moving recording medium which is established on the periphery of a rotating drum.
Figure 9:
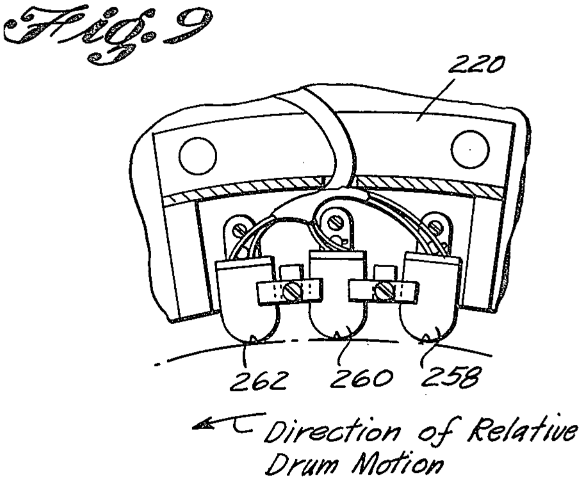
FIGURE 9 is a partially cut-away view of an assembly maintaining a record instrumentality, a playback instrumentality and an erase instrumentality in spaced relation to one another in accordance with the principles of the present invention and useful in the arrangement illustrated in FIGURE 8.
Figure 10:
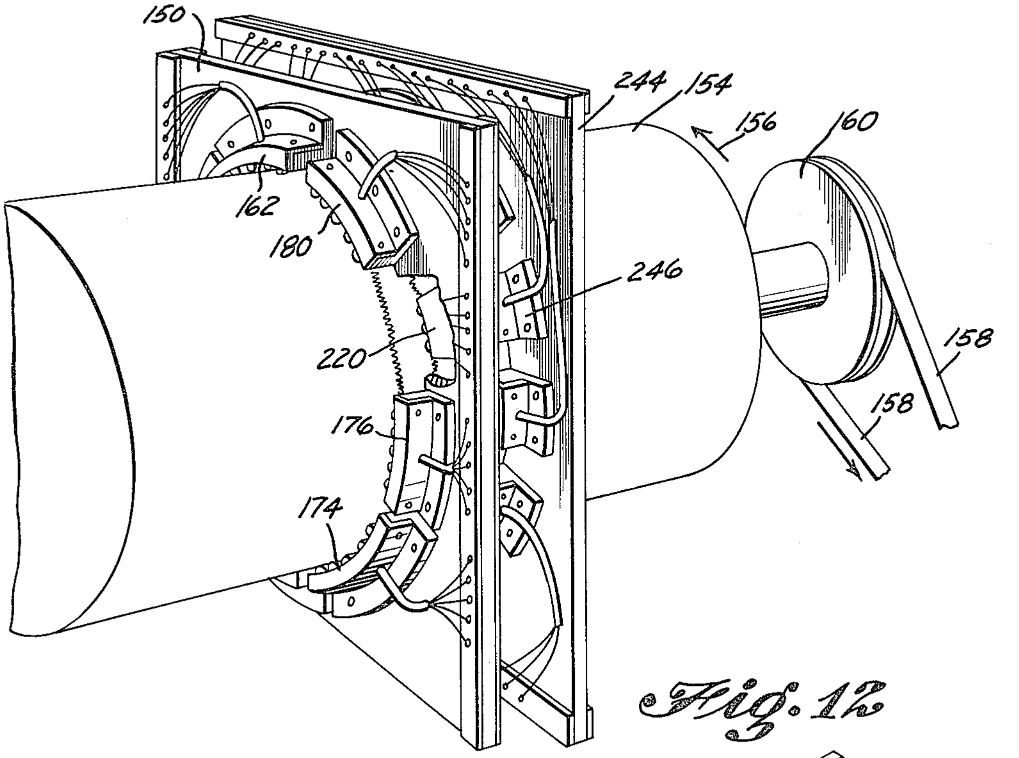
FIGURE 10 is a perspective elevational view of apparatus in which the assemblies of record, playback and erase instrumentalities shown in FIGURES 6 and 8 are positioned about the periphery of a single recording medium defined on the surface of a rotating drum.

One of the advantages of the present invention is that a large number of relative values of signal delay between two signals can be generated by equipment which is rather simple and economical to construct. This is illustrated in FIGURES 6 through 10 of the drawings. By way of example, there has been depicted in these figures one form that the present invention may take when employing magnetic recording techniques. Specifically, FIGURES 6 through 10 represent one form of physical equipment conforming to the arrangements shown in FIGURES 2*a* and 2*b* of the drawing. The apparatus shown in FIGURES 6 through 10 further represents a device capable of simultaneously generating 1440 pairs of signals, with each member of a pair representing a playback version of different signals such as A and B, as discussed hereinabove. To provide this facility, there is shown in FIGURE 6 a substantially rectangular mounting plate 150 having a circular opening 152 of a diameter sufficient to operatively embrace the outer surface of a magnetic recording drum. The magnetic recording drum is generally indicated at 154 in FIGURE 10, and the active surface thereof by the dashed line circle 154' in FIGURE 6. The drum 154 is shown in FIGURE 10 as being rotationally driven in the direction of the arrow 156 by a belt 158 acting on a pulley 160. It is understood that the belt 158 may be conventionally driven by a drive pulley (not shown) connected to some suitable power source such as an electric motor.

Turning back to FIGURE 6, the mounting plate 150 has affixed to one of its surfaces a plurality of 10 magnetic recording-playback head sets indicated at 162, 164, 166, 168, 170, 174, 176, 178 and 180. These head sets correspond to the 10 coarse delay head sets illustrated in FIGURE 2*a* so that head set 162 may be regarded as corresponding to head set number 1 in FIGURE 2*a* with the record head $R_1$ of FIGURE 2*a* indicated in FIGURE 6 at 182. Playback heads $P_{1a}$ $P_{1b}$, $P_{1c}$ and $P_{1d}$ may be positioned in head set 162 at 184, 186, 188 and 190, respectively. An erase means, if employed, may be positioned at 192, as discussed in connection with FIGURE 3. The remaining head sets, 164 through 180 in FIGURE 6, in like manner may be regarded as containing elements depicting other record and playback heads shown in FIGURE 2*a*, with head set 180 (the tenth head set) containing the elements $R_{10}$, $P_{10a}$, $P_{10b}$ and $P_{10c}$ of FIGURE 2*a* along with an erase means. As shown in FIGURE 6, the head sets are positioned on the mounting plate 150 so that the gaps of the recording instrumentalities operatively engage the surface of the drum 154 (FIGURE 10), the outline of the active surface of this drum being indicated by the dashed line 154' in FIGURE 6. Individual connections to the recording instrumentalities in each head set may conveniently be brought out in cable form such as shown at the indexes 194, and terminated on appropriate terminal strips indicated at 196 and 198.

Figure 7:
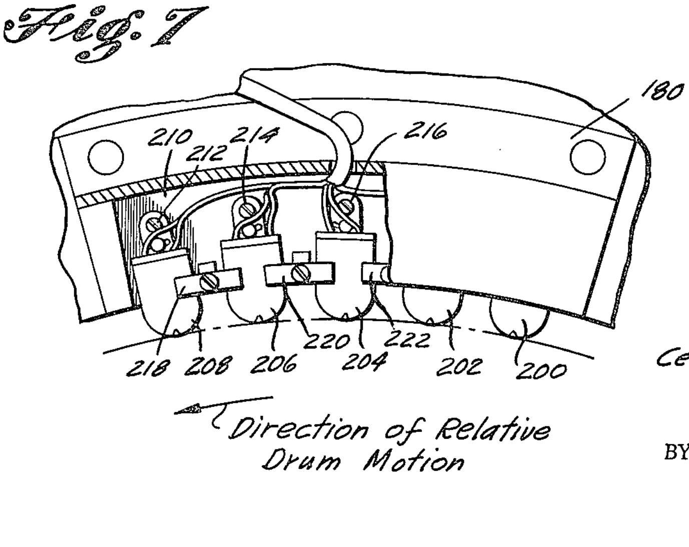
FIGURE 7 is a partially cut-away view of an assembly maintaining a record instrumentality, a plurality of playback instrumentalities, and an erase instrumentality in spaced relation to one another in accordance with the principles of the present invention and useful in the arrangement illustrated in FIGURE 6.
Figure 12:
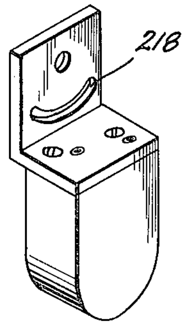
FIGURE 12 is a perspective view of one form of instrumentality suitable for recording and playback of electrical signal representations on a moving recording medium and of which the groups of record and playback instrumentalities illustrated in FIGURES 6 through 10 may be comprised.

The partially cut-away view of a typical head set suitable for use in providing coarse delay representations of a signal in accordance with the present invention is shown in FIGURE 7. Head set 180 of FIGURE 6 has, by way of example, been illustrated in FIGURE 7. The individual recording and playback head elements in the head set 180 may take the form shown in FIGURE 7. Head set 180 corresponding to the first coarse delay playback head set of FIGURE 2*a*, is therefore made up of a record head 200 and playback heads 202, 204, 206, respectively, corresponding to the tenth coarse delay head set of FIGURE 2*a* so that the record instrumentality $R_{10}$ of FIGURE 2*a* may be considered represented by the record head 200 of FIGURE 7, and playback heads $P_{10a}$, $P_{10b}$ and $P_{10c}$ represented by the playback heads 202, 204 and 206 of FIGURE 7. An erase instrumentality for the head set 180 also has been indicated at 208 and as being of the electrically excited type. The individual heads of the head set 180 are fastened to a back mounting plate indicated at 210 by means of bolts, which show at 212, 214 and 216. T-bars at 218, 220 and 222, fastened to the back of the mounting plate 210, provide a convenient way of rigidly mounting the individual record and playback heads, yet upon loosening permit easy spacing adjustment of the heads. The detail of a typical record and playback head in FIGURE 12 shows an elongated slot 218 through which a pin or screw may pass to further lend support to the structure, if desired.

The 41 fine delay head sets may be grouped around the drum surface and held by a supporting plate in a manner indicated by the head sets comprising the coarse delay channel. By way of example, an arrangement of 12 of the 41 fine delay head sets is shown in FIGURE 8. The 12 fine delay head sets depicted here at 220, 222, 224, 226, 228, 230, 232, 234, 236, 238, 240 and 242 may be mounted on the other side of the mounting plate 150 which supports the coarse delay head sets shown in FIGURE 6. The partially cut-away view of FIGURE 10 illustrates this, with coarse delay head sets 174, 176, 180 and 162 shown on one side of the mounting plate 150 and one of the 12 fine delay head sets, indicated at 220 in both FIGURES 8 and 10, mounted on the other side of the mounting plate. The 12 fine delay head sets shown in FIGURE 8 may correspond to any of the 41 fine delay head sets indicated in FIGURE 2*b*. The 29 remaining fine delay head sets may, as shown in FIGURE 10, be suitably affixed on two sides of another mounting plate 244 which surrounds the drum 154 and is in spaced relation to the mounting plate 150.

Figure 11:
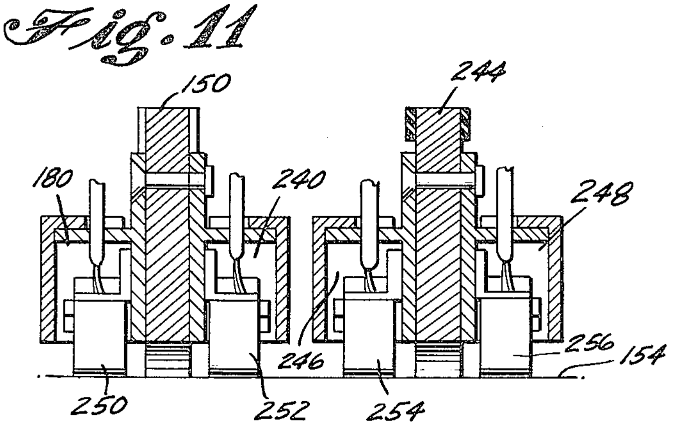
FIGURE 11 is a cross-sectional view of the assemblies of record and playback instrumentalities as mounted and positioned about the rotating drum recording medium illustrated in FIGURE 10.

A cross-sectional view of the two mounting plates 150 and 244, with head sets mounted on both sides thereof, is shown in FIGURE 11. Here, a coarse delay head set such as 180 is shown mounted on one side of the mounting plate 150, and a fine delay head set such as 240 mounted on the other side of the plate 150. Mounting plate 244, on the other hand, has a fine delay head set shown at 246 affixed to one side thereof and another fine delay head set at 248 affixed to the other side thereof. Recording and/or playback instrumentalities are shown at 250, 252, 254 and 256 in operative relation to the surface of the drum 154. A typical arrangement of record, playback and erase instrumentalities for comprising a magnetic fine delay head set is shown in FIGURE 9. Here, a fine delay head set such as 220 is shown with a record head 258, playback head 260 and erase head 262 mounted in a fashion similar to the coarse delay head set described in FIGURE 7.

It will be understood that, in FIGURES 6 through 10, no effort has been made to pictorially depict the difference in the spacings between elements comprising head sets in the manner required by the present invention. The details of the required spacings between elements in each different head set has been fully discussed in connection with FIGURES 2*a* and 2*b*.

Having thus described some of the principles of the present invention and the manner in which these principles may be embodied in physical apparatus for various uses, a further aspect of the present invention may now be more clearly understood. Reference is now made to FIGURES 2*a* and 2*b* of the drawings described above. As indicated, the output from switch 72 to the fine delay generating system is applied to the fine delay record heads through a variable delay producing means such as a controllable or variable delay line 78. The variable delay line, or other suitable delay producing apparatus, is indicated as being controllable by a delay control 266 which in turn may, by actuation of the selector switch 268, be made responsive to either a manual control influence provided by means 270 or an oscillator indicated at 272. The advantage of this novel feature of the present invention will be best understood by reference to FIGURE 13 wherein the output signals from the 1441 correlators indicated at 148, discussed in relation to the embodiment of the invention shown in FIGURE 5, is adapted for analysis by means of a scanner 276. The scanner 276 may be nothing more than a mechanical or electronic commutating means for sampling the output signals of all the 1441 correlators within a given sampling interval, such as 50 microseconds. The scanner 276 also provides scanner phase or position information to a delay indicator at 278 which gives a visible indication of the particular phase or position of the scanning action provided by the scanner 276 at which the maximum correlator output voltage is sampled. This maximum voltage is indicated by means generally indicated at 280. An oscilloscope 282 sampling the output of the scanner will, of course, depict a curve, such as 284 shown in FIGURE 14, and corresponding to a typical signal correlation function. One form of scanner, peak magnitude indicator and delay indicator for peak, is shown and described in a copending application of Neal S. Anderson, Julius S. Bendat and Cecil E. Williams, Serial No. 688,468, entitled "Signal Analyzing Apparatus," filed October 7, 1957.

The information gleaned from scanning the output of the 1441 correlators, however, may not yield precision information as to that value of correlation time delay yielding a maximum value of the correlation function between the signals being correlated. This is attributable to the fact that the signal correlation data being scanned is based upon half-microsecond intervals of correlation delay so that the peak of the correlation function may inadvertently be "skipped" by virtue of an unfortunate random beginning of the period over which the $N_t$ total values of relative time delay produced by the time delay generator system is initiated. For example, the actual or true correlation function between two signals such as A and B of FIGURES 2*a* and 2*b* may be of the form shown by the solid line curve 284 in FIGURE 14. The peak of this function occurs at a correlation time of $r_0$. However, if the relative time delays produced by the delay generator of FIGURES 2*a* and 2*b* provide data based upon specific time delay values displaced from $r_0$, such as $r_0'$ and $r_0''$, the correlation function will appear to have false peaks either at $r_0'$ or $r_0''$ indicating false curves such as 286 or 288. To overcome this possible error, the present invention provides means for varying one of the signals with respect to the other over a time delay interval of at least $\Delta t$ which, in the example being considered, is .5 microsecond. If the sources of signal A and signal B represented in FIGURE 2*a* are continuing sources of a signal, such as, for example, magnetic tape recordings of the signals to be studied, repeated correlation analysis of signal A and signal B made while manually controlling the delay produced by the variable delay means 78, will permit the exact value of $r_0$ (FIGURE 14) to be found. In an alternate form of the present invention, an oscillator 272 may be caused to control the time delay of the variable delay line over a range of time delay equal to at least $\Delta t = .5$ microsecond. This is done at a rate which is of the same order of magnitude as the smoothing time of the correlation circuits. The rate at which the oscillator 272 or manual control 270 causes the variable delay 78 to operate through its normal delay range should preferably be consistent with the band pass characteristics of the correlator output circuits. In particular, the time required to traverse the approximately .5 microsecond range of variable delay 78 should be greater than the smoothing or integration time of the correlator output. This provides an averaging effect which improves the accuracy with which the peak of the correlation curve can be detected under conditions where repeated careful analysis of signals A and B, under manual control of the variable delay means 78, is not feasible.

What is claimed is:

1. Apparatus useful in introducing a delay of $\Delta t$ time units between a first and a second electrical signal conditionally having different frequency components without imposing substantial unlike nonlinear phase distortion upon the components of each signals, comprising in combination: first and second input terminal means adapted independently to accept said first and said second electrical signals respectively; means coupled to said first input terminal means for recording said first signal on a moving recording medium traveling in a given direction; means positioned in displaced relation to said first signal recording means in the direction of said travel for playing back said first signal at a time $T_d$ time units subsequent to its recording, said recording and reproducing cycle introducing known nonlinear phase distortion upon the components of said first signal; means coupled to said second input terminal means for recording said second signal on a like-associated recording medium moving in a given direction; means positioned in displaced relation to said second recording means in the direction of travel of said associated recording medium for playing back said second signal at a time $T_d+\Delta t$ time units subsequent to its recording, said recording and reproducing means and recording medium handling said second signal being arranged to introduce substantially the same nonlinear phase distortion upon the components of said second signal, attributable to the recording and reproducing cycle thereof, as said known nonlinear phase distortion imposed on said first signal, whereby the played-back signals produced by said playing back means for said first and second signals respectively represent like versions of said two signals but delayed with respect to one another by a time interval of $\Delta t$ time units; and signal acceptance means coupled to both of said playing back means for said first and second signals whereby said first and second signals may be compared.

2. Apparatus according to claim 1 where said means for recording and playing back said first signal and said means for recording and playing back said second signal comprise individual sets of instrumentalities, each set of instrumentalities comprising a record instrumentality and a playback instrumentaliity, said sets of instrumentalities being displaced from one another in the direction of motion of a single moving recording medium.

3. Apparatus useful in introducing a time delay of $\Delta t$ time units between a first electrical signal and a second electrical signal conditionally having different frequency components without introducing substantially unlike phase distortion in each of the signals, comprising in combination: first and second input terminal means adapted independently to accept said first and said second electrical signals respectively; a first movable recording medium capable of having recorded thereon representations of an electrical signal which may be later detected and caused to produce a playback version of said electrical signal; means driving said recording medium in a given direction at a velocity $V_1$; a first recording instrumentality coupled to said first input terminal means and positioned in operative relation to said moving recording medium and having a physical size sustaining a dimension $d_1$ as measured in the direction of recording medium travel; a first playback instrumentality positioned in operative relation to said recording medium and displaced from said recording instrumentality in the direction of the recording medium travel, said playback instrumentality being of a physical size having a dimension $d_2$ as measured in the direction of recording medium travel, the dimensions $d_1$ and $d_2$ of said instrumentalities being such that with the closest practicable spacing of said instrumentalities while in operating relation to said recording medium while traveling at said velocity $V_1$, the time required for the recording and subsequent reproduction of a given signal is $T_{min_1}$ where $T_{min_1}$ is substantially greater than $\Delta t$; a second movable recording medium capable of having recorded thereon representations of an electrical signal which may be later detected and caused to produce a played-back version of said electrical signal; means driving said recording medium in a given direction at a velocity $V_2$; a second recording instrumentality coupled to said second input terminal means and positioned in operative relation to said moving recording medium and having a physical size sustaining a dimension $d_3$ in the direction of recording medium travel; a second playback instrumentality positioned in operative relation to said second recording medium and displaced from said recording instrumentality in the direction of the recording medium travel, said playback instrumentality being of a physical size having a dimension $d_4$ in the direction of recording medium travel, the dimensions $d_3$ and $d_4$ of said instrumentalities being such that with the closest practicable spacing of said instrumentalities while in operating relation to said second recording medium while traveling at said velocity $V_2$, the minimum time required for the recording and subsequent reproduction of a given signal on and from said second recording medium is $T_{min_2}$ where $T_{min_2}$ is substantially greater than $\Delta t$; means positioning said second record and reproduce instrumentalities with respect to one another by a spacing producing a time delay in recording and subsequent reproduction of a given signal which differs from $T_{min_1}$ by an amount equal to $\Delta t$ such that signals developed by said first playback instrumentality and said second playback instrumentality are delayed with respect to one another by the time $\Delta t$; and signal acceptance means coupled to both of said playback instrumentalities for said signals whereby said signals may be compared.

4. Apparatus according to claim 3 wherein means are provided for supporting the first and second recording media on substantially the same structure whereby $V_1=V_2$.

5. In an electrical signal processing apparatus, the combination of: first means for recording a signal A on a set of first tracks defined on a recording medium; a plurality of playback means displaced from said recording means and responsive to said signals recorded on said first set of tracks to develop $N_f$ different time delayed versions of signal A, each version being finely displaced in time from one other version by an incremental time value $\Delta t_f$ time units; second means for simultaneously recording during the recording of signal A, a signal B on a set of second tracks defined on a moving recording medium; a plurality of playback means displaced from said second recording means and responsive to the recorded representations of said signal B to produce $N_c$ different time delayed versions of signal B, each version being coarsely displaced in time from one another by an incremental time value $\Delta t_c$ time units such that conditional samplings of $N_f \times N_c$ different pairs of played-back signals, each pair comprising one of said $N_f$ time delayed versions of signal A and one of said $N_c$ time delayed versions of signal B, will permit the characteristics of signal A to be compared with the characteristics of signal B on a time delay basis for a series of $N_c \times N_f$ time delay values, each member of said series of said time delay values differing from one another in said series by the time value $\Delta t_f$, with the maximum time delay value between members of said series being at least equal to $N_c \times N_f \times \Delta t_f$ units of time; and signal acceptance means coupled to both playback versions of signals A and B whereby said playback versions of signals A and B may be compared.

6. Apparatus according to claim 5 where means are provided for establishing the time delay value $\Delta t_c$ as an integral multiple of the time value $\Delta t_f$.

7. Apparatus according to claim 5 wherein the minimum delay $\Delta t_c$ provided by said second means is equal to $N_f \times \Delta t_f$ time units corresponding to the maximum delay provided by said first means.

8. In a system for providing $N_t$ incremental time delay values between a signal A and a signal B over a total time delay range $T_d$ with each incremental delay being substantially an integral multiple of an elemental delay time increment $\Delta t$ such that $N_t \times \Delta t = T_d$, the combination of: a first delay channel comprising means for recording the signal A and reproducing signal A with $N_c$ discrete coarse time delays over a time delay range $T_c$, each differing from one another by the time value $T_c/N_c$ where $T_c$ is less than $T_d$ and $T_c/N_c$ is an integral multiple of $\Delta t$; a second delay channel comprising means for recording signal B and reproducing signal B with $N_f$ discrete fine time delays over a time delay range $T_f$, each differing from one another by the time value $\Delta t$ where $T_f$ is less than $T_c$ and $T_f$ but where $T_d$ is at least equal to the sum of $T_c$ and $T_f$; and means for combining the reproductions of signal A and signal B such that $N_c \times N_f$ total number of separate time delay values are provided between the reproduced versions of signal A and signal B within the time delay range $T_d$.

9. Apparatus for transducing a signal A and a signal B respectively into a plurality of electrical signal pairs with one member of each pair comprising a time delayed version of signal A and the other member of said pair comprising a time delayed version of signal B, to permit an analytical comparison of the characteristics of signal A and signal B for a series of $N_t$ discrete time delay values over a time delay range of $T_d$ time units where each member of said $N_t$ series of discrete time delay values differs from one other member in said series by a time increment of $\Delta t$ time units, comprising in combination: means operative upon at least one moving recording medium for recording a representation of signal A; playback means responsive to the recorded representations of signal A to produce a series of $N_c$ different time delayed versions of signal A such that each version in said series bears a given distortion relation to signal A by virtue of inherent distortion in the cycle comprising the recording and playback of signal A through the agency of said medium; means included in said playback means establishing each version in said series comprised of $N_c$ delayed versions of signal A in stepped time delay relation to one another with each version being displaced in time from one other version in said series by a time increment $\Delta t_c$ which is an integral multiple of $\Delta t$; means operative upon at least one moving recording medium for recording representations of signal B; playback means responsive to the recorded representations of signal B to produce a series of $N_f$ different time delayed versions of signal B such that each of said series of said $N_f$ versions bears a distortion relation to signal B which is substantially of the same character as the distortion relation between signal A and its $N_c$ playback versions; and means included in said playback means for signal B establishing each version in said series comprised of $N_c$ versions of signal B in stepped time relation to one another with each version being displaced in time from one other version in said series by a time increment $\Delta t_f$ which is substantially equal to $\Delta t$ where $N_c \times N_f$ is made to be substantially equal to $N_t$ whereby said series of $N_c$ playback versions of signal A and said series of $N_f$ playback versions of signal B may be compared in $N_t$ pairs with each member of a pair comprising a different one of said respective series; and signal acceptance means coupled to both of said playback means for said signals A and B whereby said signals A and B may be compared.

10. Apparatus according to claim 9 wherein signal A and signal B are each of discrete time durations and wherein said playback means for reproducing signal A includes means establishing the time value $N_c \times \Delta t_c$ at least equal to the time duration of either signal A or signal B to permit the simultaneous comparison of said $N_t$ pairs of signal A and signal B versions.

11. Apparatus according to claim 9 wherein said playback means comprise a plurality of playback instrumentalities in operative relation to an associated recording instrumentality and recording medium, the number of said playback instrumentalities being less than the number of playback versions to be produced, and a plurality of passive delay producing means electrically coupled with said playback instrumentalities to produce a number of delayed playback signals, the sum of the number of delayed playback signals and the number of said plurality of playback instrumentalities being substantially equal to the number of playback signal versions to be produced.

12. Apparatus according to claim 9 wherein said means to record representations of signal A and signal B taken in combination with said playback means responsive to the recorded representations of signal A and signal B comprise a magnetic recording system employing recording and reproducing instrumentalities positioned in operative relation to a moving magnetic recording member, the velocity of said member past said instrumentalities taken in combination with the physical size of said instrumentalities preventing the production of a signal delay between even contiguous record and playback instrumentalities of a value equal to $\Delta t$ and wherein means are provided for grouping said instrumentalities in a plurality of sets, each set comprising a record instrumentality and at least one playback instrumentality, the spacing between the record instrumentality and the nearest playback instrumentality being different in each different set by an amount corresponding to a delay integrally related to $\Delta t$ while the spacing between the playback instrumentalities in each of those sets conditionally containing more than one playback instrumentality corresponds to a time delay as measured between adjacent playback instrumentalities which is also an integral multiple of $\Delta t$.

13. Apparatus for analyzing the electrical relationship between the characteristics of a signal A and a signal B, comprising in combination: a source of signal A; a source of signal B; means responsive to said signal sources for providing a series of N pairs of delayed signals, each pair comprising one delayed version of signal A and one delayed version of signal B, the delay between the signals comprising any one pair being different from the delay between the signals comprising any other pair in said series by a predetermined time interval; means responsive to said N pairs of delay signals for developing output signals effectively representing the electrical comparison between the two signals in each pair; and means for controllably introducing a variable delay between said signal pair providing means and at least one of said signal sources, the maximum range of delay producible by said controllable delay introducing means being at least equal to one-half of said predetermined time interval.

14. Apparatus for analyzing the electrical relationship between the characteristics of a signal A and a signal B, comprising in combination: a source of signal A; a source of signal B; means responsive to said signal sources for providing a series of N pairs of delayed signals, each pair comprising one delayed version of signal A and one delayed version of signal B, the delay between the signals comprising any one pair being different from the delay between the signals comprising any other pair in said series by a predetermined time interval; means responsive to said N pairs of delay signals for developing output signals effectively representing the electrical comparison between the two signals in each pair; a signal responsive controllable signal delay producing means interposed between said signal pair providing means and at least one of said signal sources; and means comprising an oscillator coupled with said signal delay producing means for controlling the value of delay between signals in any given pair at the rate determined by the frequency of said oscillator.

15. Apparatus according to claim 14 wherein means are provided for establishing the range of delay produced by said delay producing means at a value substantially equal to one-half said predetermined time interval.

16. Apparatus for analyzing the relationship between the electrical characteristics of a signal A with respect to the characteristics of a signal B, comprising in combination: means comprising an input terminal for accepting one of said signals; means comprising an input terminal for accepting the other of said signals; means including a first signal delay apparatus coupled to one input terminal for providing a series of $N_c$ different delayed versions of one of said signals, the delay represented between two adjacent members of said series being of a magnitude of $\Delta t_c$ time units; means including a second signal delay apparatus coupled to the other input terminal for providing a series of $N_f$ different delayed versions of the other of said signals, the delay represented betwen two adjacent members of said series being of a magnitude of $\Delta t_f$ time units; a plurality of signal correlation circuits responsive to two signals conditionally applied thereto to develop an output signal representing an integrated value of the product of said two signals over a finite smoothing time; and means coupling to each different correlation circuit different pairs of delayed signals, one member of each pair corresponding to one of said $N_c$ versions of delayed signal produced by said first delay producing means and one of said $N_f$ delayed signal versions produced by said second delay producing means.

17. Apparatus for producing a plurality of pairs of signals representing different time delay versions of a signal A with respect to a signal B, comprising in combination: means comprising an input terminal for accepting one of said signals; means comprising an input terminal for accepting the other of said signals; means including a first signal delay apparatus coupled to one input terminal for providing a series of $N_c$ different delayed versions of one of said signals, the delay represented between two adjacent members of said series being of a magnitude of $\Delta t_c$ time units; means including a second signal delay apparatus coupled to the other input terminal for providing a series of $N_f$ different delayed versions of the other of said signals, the delay represented between two adjacent members of said series being of a magnitude of $\Delta t_f$ time units; means for selectively connecting said first-mentioned input terminal means to either of said delay apparatus and said second input terminal means to either of said delay apparatus to produce $2 \times N_c \times N_f$ pairs of signals representing different values of relative delay between signal A and signal B; and signal acceptance means coupled to each of said pairs of said signals A and B whereby said signals A and B may be compared.

18. Apparatus for analyzing the relationship between the electrical characteristics of a signal A with respect to the characteristics of a signal B, comprising in combination: means comprising an input terminal for accepting one of said signals; means comprising an input terminal for accepting the other of said signals; means including a first signal delay apparatus coupled to one input terminal for providing a series of $N_c$ different delayed versions of one of said signals, the delay represented between two adjacent members of said series being of a magnitude of $\Delta t_c$ time units; means including a second signal delay apparatus coupled to the other input terminal for providing a series of $N_f$ different delayed versions of the other of said signals, the delay represented between two adjacent members of said series being of a magnitude of $\Delta t_f$ time units; a plurality of signal correlation circuits responsive to two delayed versions of said signals A and B conditionally applied thereto to develop an output signal representing an integrated value of the product of said two signals over a finite smoothing time T; and means introduced between one of said input signal terminal means and one of said delay producing means for introducing a variable periodically recurrent time delay in one of said signals at a rate not greater than $10 \times 1/T$.

19. Apparatus according to claim 18 wherein means are provided in said variable delay producing means for producing a range of controllable delay not greater than $\Delta t$ where $\Delta t$ is equal to the maximum delay produced by either one of said delay producing means divided by an integer equal to $N_c \times N_f$.

20. In a system for producing $N_t$ different time delayed versions of an electrical signal through the process of recording and reproducing said signal on a moving recording medium, the combination of: a plurality of $N_r$ recording instrumentalities adapted to be placed in operative juxtaposition with respect to a moving medium to record thereon representations of an electrical signal conditionally applied to said recording instrumentality, said $N_r$ recording instrumentalities being less in number than the number $N_t$ of different time delayed versions to be produced from a given signal; a plurality of playback instrumentalities adapted for operative juxtaposition with respect to a recording medium for playing back recorded representations of an electrical signal as recorded on said medium by means of one of said recording instrumentalities, the physical size of said recording and playback instrumentalities taken in combination, when in contiguous relationship to one another in operative juxtaposition with a given recording medium moving past said instrumentalities at a given velocity, prevents the production of a record-playback delay as small as $\Delta t$ and likewise the physical size of said playback instrumentalities when similarly juxtaposed in contiguous relation to one another upon said given recording medium prevents the production of two time playback versions of a given signal with a time delay difference as small as $\Delta t$; means for mounting said record and playback instrumentalities in operative juxtaposition to a recording medium in groups spaced from one another along the direction of recording medium motion, each group comprising one recording instrumentality with at least one of said groups comprising a plurality of playback instrumentalities, with the spacing between the record instrumentality and nearest playback instrumentality in each group being different from one another, the value of this difference corresponding to a time delay equal to $\Delta t$ and wherein the spacing between adjacent playback instrumentalities in any group containing more than one playback instrumentality corresponds to a time delay between adjacent playback instrumentalities in any group which is an integral multiple of $\Delta t$; means interposed between said groups for effectively erasing recorded information produced by one group prior to its encounter by an adjacent group; and means for simultaneously applying the signal to be delayed to all of said recording instrumentalities.

References Cited in the file of this patent

UNITED STATES PATENTS

| | | |
|---|---|---|
| 1,851,092 | Fetter | Mar. 29, 1932 |
| 2,693,908 | Favre | Nov. 9, 1954 |
| 2,735,987 | Camp et al. | Feb. 21, 1956 |
| 2,794,965 | Yost | June 4, 1957 |
| 2,854,191 | Raisheck | Sept. 30, 1958 |
| 2,916,724 | Peterson | Dec. 8, 1959 |
| 2,927,656 | Feagin | Mar. 8, 1960 |
| 2,956,261 | Grossling | Oct. 11, 1960 |